(12) United States Patent
Duffield, III

(10) Patent No.: US 11,300,080 B2
(45) Date of Patent: Apr. 12, 2022

(54) FUEL TANK PROTECTOR VALVE AND ENGINE SYSTEMS HAVING SAME

(71) Applicant: DAYCO IP HOLDINGS, LLC, Troy, MI (US)

(72) Inventor: Chester E. Duffield, III, Warren, MI (US)

(73) Assignee: Dayco IP Holdings, LLC, Roseville, MI (US)

( * ) Notice: Subject to any disclaimer, the term of this patent is extended or adjusted under 35 U.S.C. 154(b) by 0 days.

(21) Appl. No.: 16/875,601

(22) Filed: May 15, 2020

(65) Prior Publication Data

US 2020/0362799 A1    Nov. 19, 2020

Related U.S. Application Data

(60) Provisional application No. 62/849,189, filed on May 17, 2019.

(51) Int. Cl.
*F02M 25/08* (2006.01)
*F16K 17/196* (2006.01)
(Continued)

(52) U.S. Cl.
CPC ....... *F02M 25/0836* (2013.01); *F16K 17/196* (2013.01); *B60K 15/03519* (2013.01);
(Continued)

(58) Field of Classification Search
CPC ........... F02M 25/0836; F02M 25/0809; F02M 25/0854; F16K 17/196; F16K 17/30;
(Continued)

(56) References Cited

U.S. PATENT DOCUMENTS 4,040,404 A * 8/1977 Tagawa ............ B60K 15/03519
123/519
4,679,581 A * 7/1987 Mears .............. B60K 15/03519
137/202
(Continued)

FOREIGN PATENT DOCUMENTS

CN           106195375 A      7/2016

OTHER PUBLICATIONS

PCT, International Search Report and Written Opinion, International Application No. PCT/US2020/033244 (dated Sep. 9, 2020) (8 pages).

*Primary Examiner* — Phutthiwat Wongwian
*Assistant Examiner* — Sherman D Manley
(74) *Attorney, Agent, or Firm* — FisherBroyles, LLP; Susan M. Oiler

(57) ABSTRACT

A dual chamber fuel tank protector valve has a transversely oriented divider defining a plurality of apertures for fluid flow between a first port and a second port. Each chamber has a seal disk therein. The first seal disk is normally biased to an open position by a first biasing member. The second seal disk is normally biased to a closed position by a second biasing member having a preselected biasing force set to a preselected pressure differential that allows movement to its open position before the first seal disk moves to its closed position. When the first seal disk and the second seal disk move to their respective closed positions, the direction of movement is toward one another.

20 Claims, 4 Drawing Sheets

(51) Int. Cl.
*B60K 15/035* (2006.01)
*F16K 15/02* (2006.01)

(52) U.S. Cl.
CPC ..... *F02M 25/0809* (2013.01); *F02M 25/0854* (2013.01); *F16K 15/028* (2013.01)

(58) Field of Classification Search
CPC ................ F16K 15/028; F16K 15/066; B60K 15/03519; B60K 15/03504; B60K 15/03514
See application file for complete search history.

(56) References Cited

U.S. PATENT DOCUMENTS

| | | | |
|---|---|---|---|
| 4,862,856 A | 9/1989 | Yokoe et al. | |
| 5,183,075 A * | 2/1993 | Stein | F02M 59/462 137/493.6 |
| 5,230,360 A * | 7/1993 | Journee | B60K 15/03519 137/202 |
| 5,247,958 A * | 9/1993 | Deparis | B60K 15/03519 137/43 |
| 5,477,829 A * | 12/1995 | Hassinger | F02M 37/10 123/467 |
| 5,623,910 A * | 4/1997 | Riggle | F02M 37/0058 123/459 |
| 5,687,778 A * | 11/1997 | Harris | B60K 15/0406 137/43 |
| 6,209,527 B1 * | 4/2001 | Bueser | F16K 17/06 123/506 |
| 6,988,488 B2 * | 1/2006 | Pursifull | F02M 37/0029 123/467 |
| 7,086,388 B2 * | 8/2006 | Roth | F16K 17/196 123/510 |
| 7,178,511 B2 * | 2/2007 | Dickenscheid | F02M 37/106 123/510 |
| 8,091,583 B2 * | 1/2012 | Olshanetsky | F02M 63/0043 137/493.2 |
| 9,169,815 B2 * | 10/2015 | Akita | F02M 59/462 |
| 9,200,719 B2 * | 12/2015 | Kishi | F16K 17/30 |
| 2002/0074042 A1 * | 6/2002 | Olivas | F16K 17/30 137/493.9 |
| 2006/0032534 A1 * | 2/2006 | Emke | F16K 17/196 137/493.8 |
| 2006/0081224 A1 * | 4/2006 | Spink | F02M 25/0836 123/519 |
| 2009/0107563 A1 * | 4/2009 | Eichler | F16K 17/30 137/460 |
| 2012/0222759 A1 * | 9/2012 | Knis | F16K 1/443 137/512.2 |
| 2015/0028234 A1 * | 1/2015 | Kraus | B64G 1/402 251/11 |
| 2015/0338099 A1 * | 11/2015 | Deng | F23D 23/00 431/280 |
| 2017/0138496 A1 * | 5/2017 | Robert | A62C 37/12 |
| 2019/0093775 A1 * | 3/2019 | Feith | A61M 39/24 |
| 2020/0362799 A1 * | 11/2020 | Duffield, III | F16K 17/196 |

* cited by examiner

FUEL TANK PROTECTOR VALVE AND ENGINE SYSTEMS HAVING SAME

RELATED APPLICATIONS

This application claims the benefit of U.S. Provisional Application 62/849,189, filed May 17, 2019, which is incorporated herein by reference in its entirety.

TECHNICAL FIELD

This application relates to fuel vapor purge systems having a bypass valve, more particularly, to a protector valve having inline independently tunable check valve disks operable to close and prevent sudden low pressures in a fuel tank that could collapse or damage the fuel tank.

BACKGROUND

Fuel vapor emission or purge control systems are implemented in internal combustion engine systems to comply with environmental and safety regulations. These systems prevent fuel vapor from escaping to the atmosphere, for example, by venting fuel vapors to a purge canister which contains charcoal. Under preselected engine conditions, a purge valve opens and vacuum from the intake manifold draws the vapor to the engine's combustion chamber to be burned as part of the aggregate fuel-air mixture.

Another requirement of such systems is a leak-detection system. Some systems have been implemented that utilize a two-way airflow system between the purge valve and the intake manifold. However, typically fuel tanks are made of plastic, which are susceptible to expansion and contraction if internal tank pressure become excessively high or excessively low (deep vacuum). Such physical characteristics of the fuel tank can pose a problem of tank burst or tank collapse, respectively. There is a need to protect the fuel tank from extreme pressures, especially excessive negative (vacuum) pressure that can cause a sudden evacuation of the fuel vapors from the fuel tank. A device that allows lower volumetric evacuation of the fuel vapors form a same volume is desired.

SUMMARY

In all aspects, fuel tank protector valves are disclosed that have a housing having a first port and a second port, and defining an internal chamber having a transversely oriented divider defining a plurality of apertures for fluid flow from the first port to the second port. The divider separates the internal chamber into a first check valve chamber and a second check valve chamber. A first seal disk is positioned in the first check valve chamber and is normally biased to an open position by a first biasing member having a first biasing force. A second seal disk is positioned in the second check valve chamber and is normally biased to a closed position by a second biasing member having a second biasing force. The first seal disk and the second seal disk move toward one another during movement to their respective closed positions. The second biasing force is set to a preselected pressure differential that moves the second seal disk to an open position before the first seal disk moves to a closed position, and, when the first seal disk is in the open position, fluid flows from the first port through the first check valve chamber and acts on the second seal disk to move the second seal disk to the open position when the preselected pressure differential is exceeded.

The first and second biasing members, for example springs, are independently tunable to set the first biasing force and the second biasing force. The first biasing member is seated against the divider and is compressed against the divider by an adjustable first fastener. The first biasing member can be seated over a shaft that receives the first fastener. In one example embodiment, the shaft is threaded and the first fastener is a nut. The second biasing member is seated against the second sealing disk and is compressed against the second sealing disk by an adjustable second fastener. The second biasing member is seated over a shaft receiving the second fastener. In one example embodiment, the shaft is threaded and the second fastener is a nut.

In all aspects, the first seal disk is biased toward the first port in the open position and the second sealing disk is biased toward the first port in the closed position.

The divider defines a seat for the second seal disk in the closed position. The closed position of the first seal disk and the second seal disk are spaced apart a distance from one another to define a sealed subchamber.

In all aspects, fuel vapor purge systems are disclosed that have a fuel tank in fluid communication with a purge canister and with an internal combustion engine, and a fuel tank protector valve in fluid communication between the fuel tank and the purge canister. The fuel tank protector valve has inline opposing check valves comprising a having a normally open check valve most proximate the fuel tank and a normally closed check valve most proximate the purge canister. The normally open check valve and the normally closed check valve are independently tunable and are tuned for the normally closed check valve to open at a preselected pressure differential and flow rate that meets a system requirement of the fuel vapor purge system before the normally open check valve moves to a closed position.

In all aspects, both the normally open and the normally closed check valves are tuned to be closed during a purge canister evacuation event, are tuned for fluid flow from the tank to the canister to not exceed the system requirement during operation of the engine and/or engine off, and to both be closed when the pressure differential between the fuel tank and the purge canister is greater than the system requirement.

The internal combustion engine has a turbocharger and a Venturi device in a bypass loop around the turbocharger, the Venturi device having a suction port in fluid communication with the fuel tank and/or purge canister.

The system has a vapor control valve controlling the fluid communication between the fuel tank and the purge canister, and the fuel tank protector valve is in a bypass loop around the vapor control valve. The internal combustion engine has a turbocharger, a Venturi device is positioned in a bypass loop around the turbocharger, and the suction port of the Venturi device in fluid communication with the vapor control valve.

DETAILED DESCRIPTION

Figure 1:
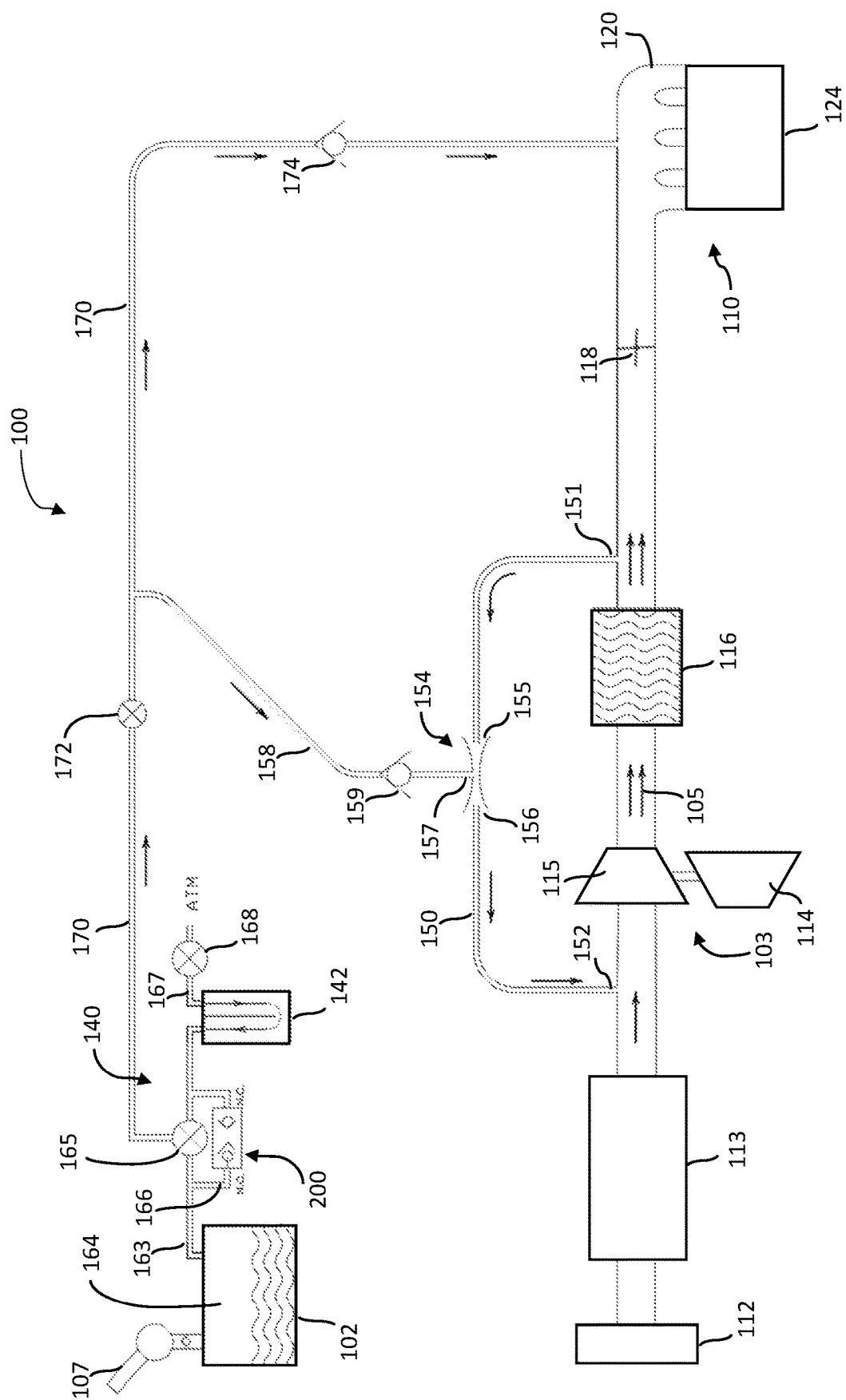
FIG. 1 is a schematic illustration of a turbocharged engine system with a fuel tank protector valve.

The following detailed description will illustrate the general principles of the invention, examples of which are additionally illustrated in the accompanying drawings. In the drawings, like reference numbers indicate identical or functionally similar elements.

As used herein, "fluid" means any liquid, suspension, colloid, gas, plasma, or combinations thereof.

Referring now to FIG. 1, an engine system 100, which is a turbocharged or supercharged system having a turbocharger, a supercharger or the like, referred to herein collectively as turbocharger 103, is shown. However, in other embodiments, (not shown), the engine system can be a naturally aspirated engine. The engine system 100 is configured for combusting fuel vapor from a fuel tank 102 which accumulates in at least one component thereof and includes a multi-cylinder internal combustion engine 110. The engine system 100 receives air from an air intake 112, which may include an air filter 113 (also known as an air cleaner). The turbocharger 103 has a turbine 114 operating a compressor 115, which receives air from the air intake 112, compresses the air, and directs a flow of compressed air 105 (or boosted air) downstream through a charge air cooler or intercooler 116 and then to a throttle 118. The throttle 118 controls fluid communication between the compressor 115 and the intake manifold 120 of the engine 110. The throttle 118 is operable using known techniques to vary an amount of intake air provided to the intake manifold 120 and the cylinders of the engine. In alternative embodiments, the intercooler 116 may be positioned downstream of the throttle, and as such, may be housed in the intake manifold.

The fuel tank 102 is a reservoir for holding fuel to be supplied to the internal combustion engine 110 via a fuel deliver system such as a fuel pump (not shown) and includes a filler neck 107. A controller can regulate the operation of the engine and its fuel delivery and/or the evaporative emissions. A bypass conduit 150 is included around the turbocharger 103. The bypass conduit 150 in FIG. 1 has an entrance 151 downstream of the compressor 115 and upstream of the throttle 118 and has an exit 152 upstream of the compressor 115. The entrance 151 may be upstream or downstream of the intercooler 116. The bypass conduit 150 includes a Venturi device 154 for generating vacuum. The Venturi device 154 has a motive entrance 155 in fluid communication with the entrance 151, a discharge exit 156 in fluid communication with the exit 152, and a suction portion 157 in fluid communication with the fuel tank 102 and the purge canister 142 via a suction conduit 158. The Venturi device 154 may have the particulars of any of the devices in any of Applicant's co-pending applications or granted patents, e.g., U.S. Pat. Nos. 9,827,963 and 9,534,704, and may include an integral check vale 159 preventing flow from the Venturi device 154 through the suction port 157 toward the fuel tank 102. Otherwise, the check valve 159 may be a separate check valve in the suction conduit 158.

Here, the fuel tank 102 is operatively connected to an evaporative emissions control system 140. The purge canister 142 is connected to the fuel tank 102 for fluid communication therewith through a first conduit 163 having a vapor control valve 165. The first conduit 163 provides fluid communication with vapors in a head space 164 within the fuel tank 102 and the purge canister 142. The evaporative emissions control system 140 also includes a fuel tank protector valve 200 positioned in fluid communication between the fuel tank 102 and the purge canister 142, more specifically in a bypass loop 166 around the vapor control valve 165. The fuel tank protector valve 200 is described in detail subsequently with respect to FIGS. 2-5. In the bypass loop 166 the fuel tank protector valve 200 is positioned with a normally open valve most proximate the fuel tank 102 and with a normally closed valve most proximate the purge canister 142. The purge canister 142 has a second conduit 167 in fluid communication with atmosphere (ATM). A canister vent valve 168 is present in the second conduit 167 and controls the fluid communication between the purge canister 142 and ATM.

Still referring to FIG. 1, the vapor control valve 165 controls the fluid communication from the fuel tank 102 and the purge canister 142 to the engine 110, i.e., controlling the release of fuel vapor to the engine's intake manifold 120 via vapor conduit 170, and vapor conduit 170 includes a canister purge valve 172 to regulate the flow to the intake manifold. The canister purge valve 172 can be a high restriction flow and metered flow valve. Fuel vapors enter the purge canister through the first conduit 160 and gasses after being acted upon by the charcoal or other adsorbent material in the purge canister can exit the purge canister through the fresh air conduit 167. The vapor conduit 170 may also include a vapor check valve 174 preventing flow from the intake manifold 120 toward the fuel tank 102.

Referring now to FIGS. 2-5, the fuel tank protector valve 200 is shown in more detail. The fuel tank protector valve 200 has dual inline check valves—a having a normally open check valve 202 most proximate a first port 206 in fluid communication with the fuel tank 102, thereby being most proximate the fuel tank, and a normally closed check valve 204 most proximate a second port 208 in fluid communication with the purge canister 142, thereby being most proximate the purge canister. The normally open check valve 202 and the normally closed check valve 204 are independently tunable and are tuned for the normally closed check valve 204 to open at a preselected pressure differential before the normally open check valve 202 moves to a closed position. As such, the valve 200 allows fluid flow in one direction under preselected conditions, i.e., pressure differential and flow rate, and prevents fluid flow in an opposite higher flow condition, which creates a tunable hysteresis pressure and flow dependent valve. In the engine system of FIG. 1, the valve 200, at low flow rates and low pressure differential allows flow to pass from the fuel tank 102 to the purge canister 142, but during high flow rates and high differential pressure, the valve is closed to prevent sudden low pressures in the fuel tank 102, which could damage or collapse the fuel tank.

The normally open valve can be tuned to close within 1 kPa to 2 kPa of the preselected requirement of a control system for a particular engine system based on the setpoints selected for said engine system.

Figure 2:
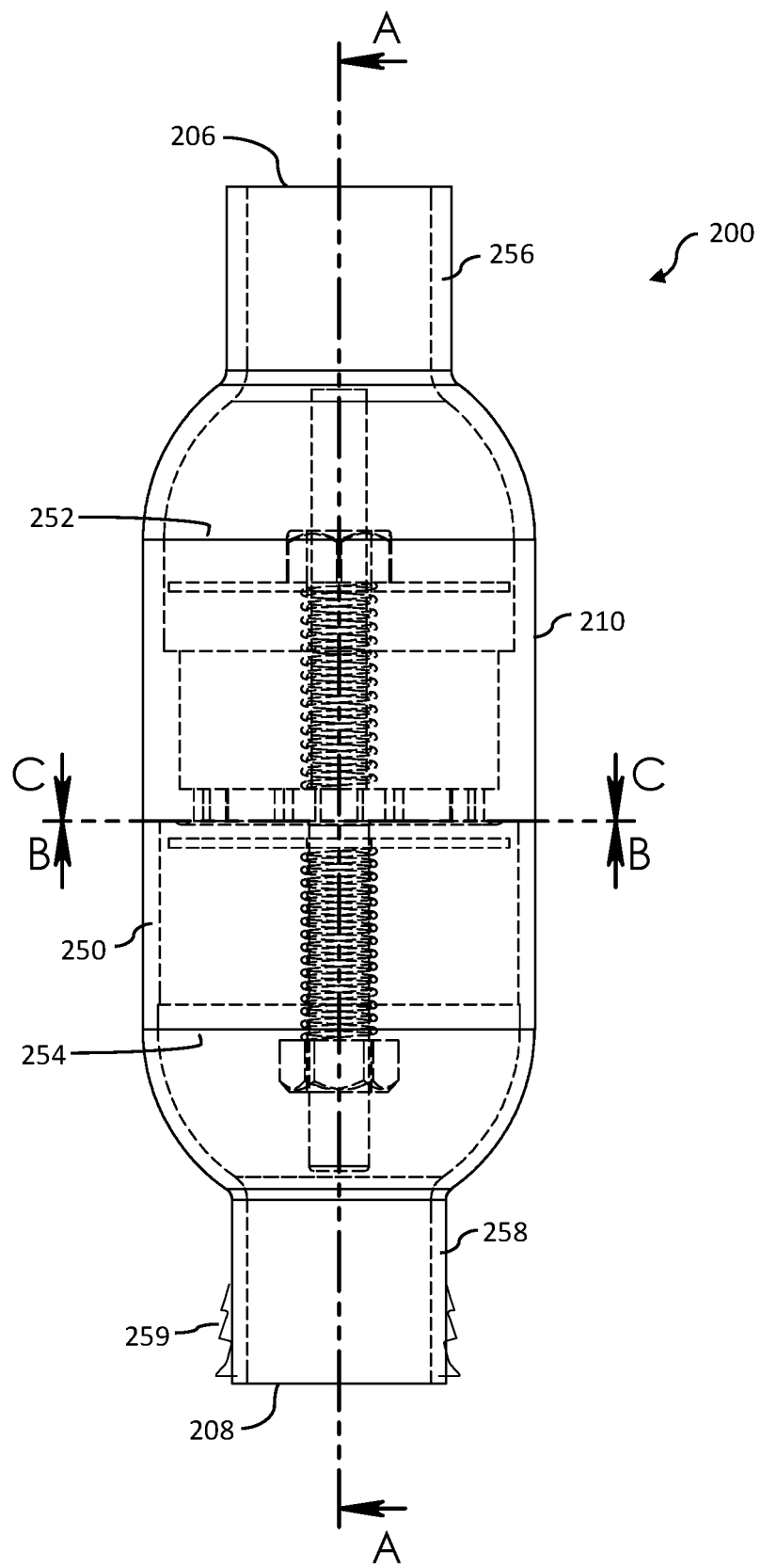
FIG. 2 is a front plan view of a fuel tank protector valve with internal details shown with dashed lines.

The flow direction though the protector valve 200 is indicated by arrows in FIG. 2, which is from the fuel tank to the purge canister when both of the check valves 202, 204 are in the open position. The protector valve 200 includes a housing 210 defining an internal cavity 211 and a first port 206 in fluid communication with the internal cavity 211 and a second port 208 in fluid communication with the internal cavity 211. The internal cavity 211 has a transversely oriented divider 212 defining a plurality of apertures 214 for fluid flow from the first port to the second port. The divider 212 separates the internal cavity 211 into a first check valve chamber 220 and a second check valve chamber 220. A first seal disk 228 is positioned in the first check valve chamber 220 and is normally biased to an open position by a first biasing member 226 having a first biasing force, and a second seal disk 238 is positioned in the second check valve chamber 220 and is normally biased to a closed position by a second biasing member 236 having a second biasing force.

Figure 3:
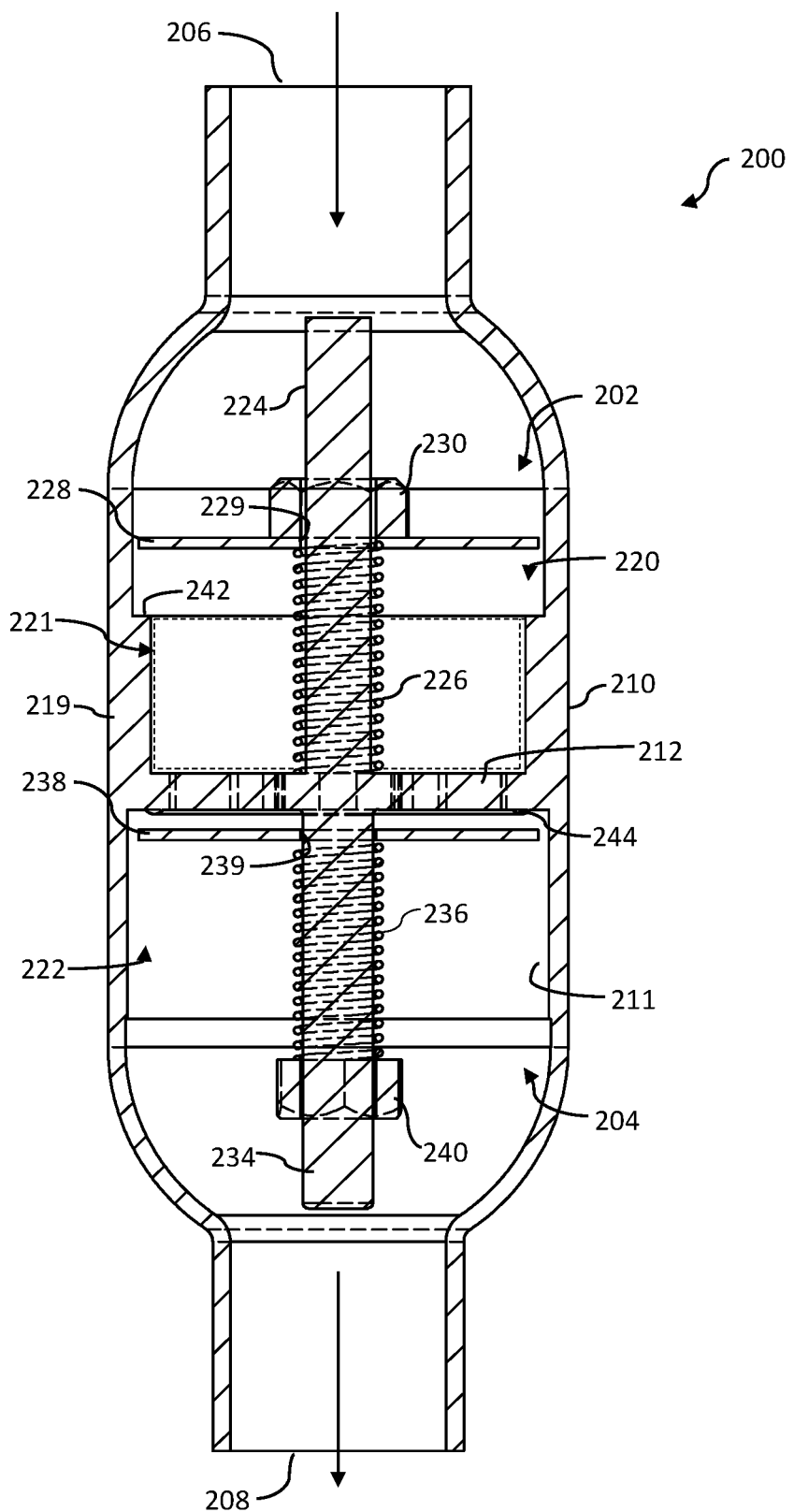
FIG. 3 is a longitudinal cross-section of the fuel tank protector valve along line A-A in FIG. 1.
Figure 4:
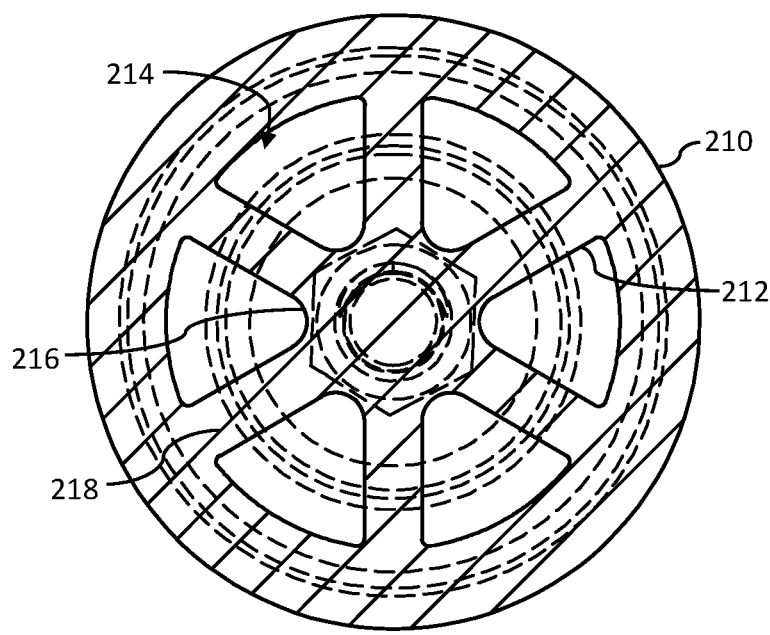
FIG. 4 is a transverse cross-section of the fuel tank protector valve along line B-B in FIG. 1.
Figure 5:
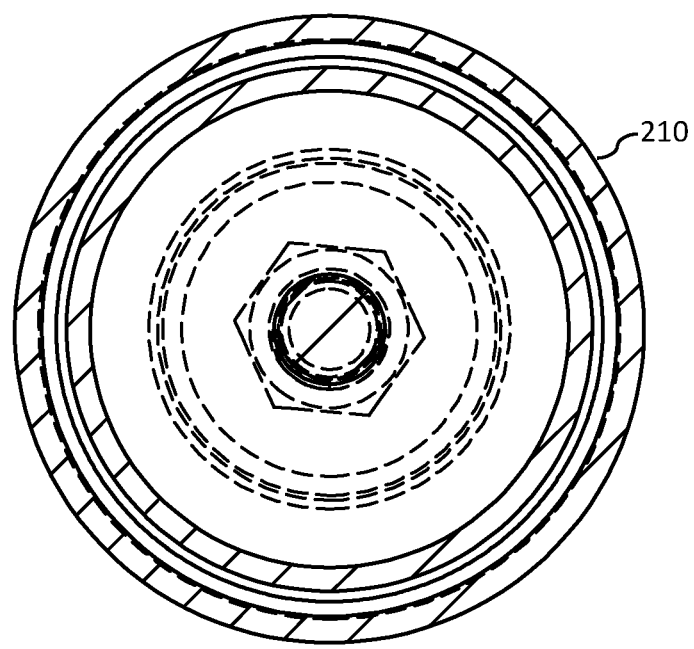
FIG. 5 is a transverse cross-section of the fuel tank protector valve along line C-C in FIG. 1.

As illustrated in FIG. 3, the divider 212 is shaped as central hub 216 with a plurality of spokes 218 extending radially outward and join a wall 219 of the housing 210. As best seen in FIG. 2, extending axially from the divider 212 toward the first port is a first shaft 224 upon which is seated a first biasing member 226. The first biasing member 226 is seated against the divider 212 in compression thereagainst by an adjustable fastener 230. The first biasing member 226 is operatively biasing a first seal disk 228 to an open position toward the first port 206, and hence toward the fuel tank, against the fastener 230. The fastener 230 is releasably, adjustably fastened to the shaft 224. Additionally, extending axially form the divider 212 toward the second port is a second shaft 234 upon which is seated a second biasing member 236. The second biasing member 236 is operative biasing a second seal disk 238 to a closed position against the divider 212 in a direction toward the first port, and hence toward the fuel tank. The second biasing member is held in selectable compression by a fastener 240 releasably, adjustably fastened to the second shaft 234. Each fastener 230, 240 being releasably, adjustably attached to its shaft 224, 234 makes each check valve 202, 204 independently tunable.

Still referring to FIG. 2, the portion of the housing 210 defining the first check valve chamber 220 defines a first seat 242 for the closed position of the first check valve 202. The first seat 242 may be in the form of an annular step or shoulder defined in an interior wall of the housing 210. The divider 212 defines a second seat 244, which may be a first annular seal bead, upon which the seal disk 238 seats when the second check valve 204 is closed. If desired, a second annular seal bead (not shown) may be present at the central hub 216, which is radially inward of the first annular seal bead. Alternately, the portion of the housing 210 defining the second check valve chamber 222 could define the second seat in the same manner as in the first check valve, i.e., an annular step or shoulder defined in an interior wall of the housing. Based on the positions of the first seat 242 and the second seat 244, the closed position of the first seal disk and the closed position of the second seal disk are spaced apart a distance from one another to define a sealed subchamber 221, and movement of first seal disk 228 and the second seal disk 238 to the closed positions is toward one another.

The housing 210 may be a multiple piece housing with pieces connected together with a fluid-tight seal. As best seen in FIG. 1, the housing 210 may have a central body 250 having two open ends 252, 254 that are capped with generally funnel shaped caps 256, 258 that define the first port 206 and second port 208, respectively. The first port 206 and the second port 208 may each define or include an elongate connector extending away from the central body 250 and may each include a connector feature 259 shown on the outer surface of the second port 208 in FIG. 1 or at the end thereof. The internal cavity 211 typically has larger dimensions than the first port 206 and the second port 208 to provide adequate dimensions for receipt of the first and second seal disks 228, 238. In the illustrated embodiment, the first port 206 and the second port 208 are positioned opposite one another but is not limited to this configuration.

In another embodiment, the first and second ports may be positioned relative to one another at an angle of less than 180 degrees.

In all embodiments, the biasing members may be springs, such as coil springs, or tubularly-shaped, compressible elastomeric members.

In one embodiment, the shafts 224, 234 are each threaded and the fastener is a nut, which may be lockable once the protector valve 200 is tuned. In another embodiment, the shaft may include a plurality of spaced apart radially extending bores for receipt of a cotter pin fastener (not shown). In yet another embodiment, the shaft is not threaded and the fastener is a clamp affixable to the shaft.

The seal disks 228, 238 are each a generally flat planar disk having a central bore 229, 239 (labeled in FIG. 2) therethrough that receive the shaft 224, 234, respectively. The seal disks may be or includes an elastomeric material suitable for use in fluid communication with fuel vapors of an internal combustion engine, i.e., is durable when exposed to chemicals, temperatures, and pressures associated with such an environment. In one embodiment, the seal disks may be or include one or more of a natural rubber, synthetic rubber, silicone rubber, fluorosilicone rubber, fluorocarbon rubber, nitrile rubber, EPDM, PTFE, and combinations thereof, but is not limited thereto. Further, the seal disks may be or include metal, plastic, and/or rubber composite.

The protector valve 200 is tuned to have a first preselected pressure drop to open the normally closed check valve (the second check valve 204) before the first check valve 202 closes, but both check valves 202, 204 close under the conditions present during a purge canister evacuation event and both open for fluid flow from the fuel tank to the purge canister during operation of the engine and/or engine off conditions. For example, the protector valve 200 may be tuned to have the normally open and normally closed check valves both closed when the pressure differential between the fuel tank and the purge canister are appropriate for a particular engine system.

The advantages and/or benefits of the fuel tank protector valve include a simplified design, not requiring electromotive controls, separately tunable biasing members for customization of the same device for multiple engine systems, but most importantly the protection afforded to the fuel tank to avoid damage from extreme low or high pressure.

It should be noted that the embodiments are not limited in their application or use to the details of construction and arrangement of parts and steps illustrated in the drawings and description. Features of the illustrative embodiments, constructions, and variants may be implemented or incorporated in other embodiments, constructions, variants, and modifications, and may be practiced or carried out in various ways. Furthermore, unless otherwise indicated, the terms and expressions employed herein have been chosen for the purpose of describing the illustrative embodiments of the present invention for the convenience of the reader and are not for the purpose of limiting the invention.

Having described the invention in detail and by reference to preferred embodiments thereof, it will be apparent that modifications and variations are possible without departing from the scope of the invention which is defined in the appended claims.

What is claimed is:
1. A fuel tank protector valve comprising:
   a housing having a first port and a second port, and defining an internal chamber having a transversely oriented divider defining a plurality of apertures for fluid flow from the first port to the second port, wherein the divider separates the internal chamber into a first check valve chamber and a second check valve chamber;
a first seal disk positioned in the first check valve chamber and normally biased to an open position by a first biasing member having a first biasing force; and
a second seal disk positioned in the second check valve chamber and normally biased to a closed position by a second biasing member having a second biasing force;
wherein, when the first seal disk and the second seal disk move to a closed position, the direction of movement is toward one another;
wherein the second biasing force is set to a preselected pressure differential that moves the second seal disk to an open position before the first seal disk moves to a closed position;
wherein, when the first seal disk is in the open position, fluid flows from the first port through the first check valve chamber and acts on the second seal disk to move the second seal disk to the open position when the preselected pressure differential is exceeded.

2. The protector valve of claim 1, wherein the first and second biasing members are independently tunable to set the first biasing force and the second biasing force.

3. The protector valve of claim 2, wherein the first and second biasing members are springs.

4. The protector valve of claim 2, wherein the first biasing member is seated against the divider and is compressed against the divider by an adjustable first fastener.

5. The protector valve of claim 4, wherein the first biasing member is seated over a shaft receiving the first fastener.

6. The protector valve of claim 5, wherein the shaft is threaded and the first fastener is a nut.

7. The protector valve of claim 5, wherein the second biasing member is seated against the second sealing disk and is compressed against the second sealing disk by an adjustable second fastener.

8. The protector valve of claim 7, wherein the second biasing member is seated over a shaft receiving the second fastener.

9. The protector valve of claim 8, wherein the shaft is threaded and the second fastener is a nut.

10. The protector valve of claim 1, wherein the first seal disk is biased toward the first port in the open position and the second sealing disk is biased toward the first port in the closed position.

11. The protector valve of claim 1, wherein the divider defines a seat for the second seal disk in the closed position.

12. The protector valve of claim 1, wherein the closed position of the first seal disk and the second seal disk are spaced apart a distance from one another to define a sealed subchamber.

13. A fuel vapor purge system comprising:
a fuel tank in fluid communication with a purge canister and with an internal combustion engine;
a fuel tank protector valve in fluid communication between the fuel tank and the purge canister, the fuel tank protector valve comprising:
inline opposing check valves having a having a normally open check valve most proximate the fuel tank and a normally closed check valve most proximate the purge canister;
wherein the normally open check valve and the normally closed check valve are independently tunable and are tuned for the normally closed check valve to open at a preselected pressure differential and flow rate that meets a system requirement of the fuel vapor purge system before the normally open check valve moves to a closed position.

14. The system of claim 13, wherein the internal combustion engine has a turbocharger.

15. The system of claim 13, comprising a Venturi device in a bypass loop around the turbocharger, the Venturi device having a suction port in fluid communication with the fuel tank and/or purge canister.

16. The system of claim 13, wherein both the normally open and the normally closed check valves are tuned to be closed during a purge canister evacuation event.

17. The system of claim 16, wherein both the normally open and the normally closed check valves are tuned for fluid flow from the tank to the canister to not exceed the system requirement during operation of the engine and/or engine off.

18. The system of claim 13, wherein the fuel tank protector valve is tuned to have the normally open and normally closed check valves both closed when the pressure differential between the fuel tank and the purge canister is greater than the system requirement.

19. A fuel vapor system comprising:
a fuel tank in fluid communication with a purge canister and with an internal combustion engine;
a fuel tank protector valve in fluid communication between the fuel tank and the purge canister, the fuel tank protector valve comprising:
inline opposing check valves having a having a normally open check valve most proximate the fuel tank and a normally closed check valve most proximate the purge canister;
wherein the normally open check valve and the normally closed check valve are independently tunable and are tuned for the normally closed check valve to open at a preselected pressure differential and flow rate that meets a system requirement of the fuel vapor purge system before the normally open check valve moves to a closed position; and
a vapor control valve controlling the fluid communication between the fuel tank and the purge canister, and having the fuel tank protector valve in a bypass loop around the vapor control valve.

20. The system of claim 19, wherein the internal combustion engine has a turbocharger, and a Venturi device is positioned in a bypass loop around the turbocharger, the Venturi device having a suction port in fluid communication with the vapor control valve.

* * * * *